July 15, 1958

C. J. PENTHER 2,843,147

FLUID PRESSURE SYSTEM INCLUDING A
VIBRATING THROTTLING VALVE

Filed Sept. 22, 1952

Inventor:
Carl J. Penther
By
His Agent

July 15, 1958

C. J. PENTHER 2,843,147

FLUID PRESSURE SYSTEM INCLUDING A
VIBRATING THROTTLING VALVE

Filed Sept. 22, 1952

Inventor: Carl J. Penther
By
His Agent

2,843,147

FLUID PRESSURE SYSTEM INCLUDING A VIBRATING THROTTLING VALVE

Carl Joseph Penther, Oakland, Calif., assignor to Shell Development Company, Emeryville, Calif.

Application September 22, 1952, Serial No. 310,889

1 Claim. (Cl. 137—487.5)

This invention relates to flow controlling apparatus and pertains more particularly to an electrically-operated throttling valve adapted to open and close periodically at a rapid rate throughout the period that a fluid flow is passing through the valve.

The present control valves employed in flow control service are mainly of the solenoid type which open and remain, for example, open when the coil thereof is energized, and subsequently close automatically when the coil is de-energized. Solenoid-type valves are suitable for use in systems handling high flow rates and in systems where a highly sensitive control of the flow rate is not required. However, as normally used, they result in on-and-off action with its well-known limitation of pulsations and/or limited range of control as herein described below. Continuous operation of the valves also causes them to chatter.

The normal method of maintaining a vacuum system at a predetermined pressure is to incorporate in the system a vacuum pump which overpumps the desired pressure, i. e., one which pulls the system down to a lower vacuum than is desired, and then to allow air to leak into the system until the desired pressure is attained. The electrically-operated valves presently employed in vacuum systems operate on an on-and-off cycle, as, for example, when a manometer-type mercury column or a diaphragm breaks, at the end of an "on" period, an electrical contact, which, through a vacuum-tube relay circuit, causes the valve to admit air into the system. In general, vacuum systems are handicapped by the surges of air entering the system in the above-described manner. On the other hand, if the valve opening is throttled down to minimize the surges, its ability to take care of variations in load and pump rate are also lessened.

It is therefore a primary object of this invention to provide a valve which continuously opens and closes at a constant relatively high frequency, varying the flow therethrough by increasing or decreasing the length of time the valve is opened during each cycle, whereby a smooth throttling action is obtained.

It is also an object of this invention to provide an electrically-actuated throttling valve for a vacuum system, the valve being adapted to open and close rapidly at a constant frequency, the open portion of each cycle being proportional to the deviation from the desired control valve of the vacuum.

These and other objects of this invention will be understood from the following description taken with reference to the attached drawings, wherein.

Figure 1:
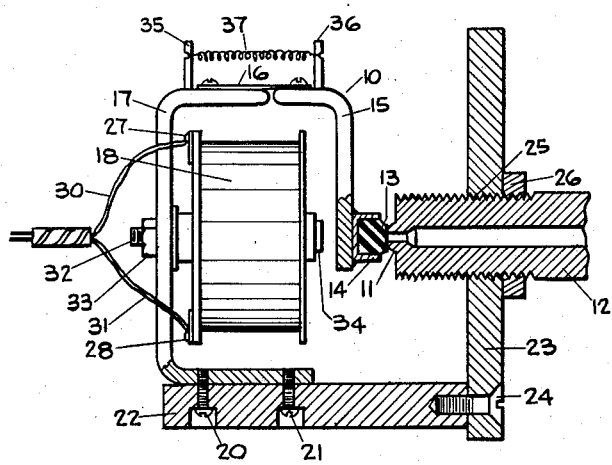
Figure 1 is a view, partly in cross section, of the vibrating throttling valve of the present invention.

Referring to Figure 1 of the drawing, the valve structure 10 is shown mounted adjacent a fluid bleed nozzle 11 at the end of a conduit tube 12. The valve closure member consists of a gum rubber plug 13 mounted in a cup holder 14. The holder 14 in turn is fixedly secured, as by welding, to the lower end of a movable arm member 15.

The arm member 15 is hinged in any suitable manner, preferably by means of a leaf spring 16, to a housing or yoke 17 which partially surrounds a coil 18. In order to locate the valve structure in a fixed position with regard to the bleed nozzle 11 of conduit 12, the housing 17 is secured by means of screws 20 and 21 to post 22 which in turn is affixed to a base plate 23 by a screw 24. The base plate 23 is in turn mounted on the threaded portion 25 of the conduit tube 12 and locked in position by a nut 26.

The coil 18 may consist of a standard 115 or 220 volt coil having terminals 27 and 28 to which leads 30 and 31 from a suitable power source (not shown) may be connected. The coil 18 is secured to the housing 17 by a bolt 32 and nut 33 and is positioned so that the axis of the coil is at right angles to the hinged arm member 15 which is actuated when the coil is energized. Preferably, a non-magnetic spacing disc 34 is provided on the side of the coil adjacent the arm member 15 thus obviating the possibility of the arm member adhering to the coil 18 momentarily by an induced magnetism when the coil is de-energized.

In the structure illustrated in Figure 1, the leaf spring 16 may serve both as a hinge permitting movement of the arm member 15 and also as a spring for normally maintaining the rubber plug 13 against the bleed nozzle 11. If desired, additional spring means may be employed to close the nozzle 11 in a fluidtight manner against the pressure of the fluid in conduit 12. The auxiliary spring means may comprise a pair of posts 35 and 36 affixed to the housing 17 and arm member 15, respectively, with a tension spring 37 secured between the posts 35 and 36 near the upper ends thereof. If desired, means for adjusting the spring tension may be employed.

The spacing between the arm member 15 and the coil 18 may be pre-set to any desired dimension. Preferably, the space between the arm 15 and coil 18 and hence the movement of the rubber plug 13 is sufficient to allow a full stream of fluid to bleed from the nozzle 11. The rate of fluid discharge from the conduit 12 may be altered by changing the size of the bleed nozzle 11.

In operation, when the coil 18 is connected by leads 30 and 31 to a source of pulsating current, as described hereinbelow, magnetic flux is set up in the present valve structure, passing horizontally through the bolt 32 supporting the coil, through the housing 17, and arm member 15 and across the air gap and disc 34 back to the bolt 32. It may be seen that the hinged arm member 15 forms the armature of the system. The energized coil 18 causes the arm member 15 and rubber plug 13 to vibrate at a rate of, say 60 cycles per second, thus rapidly opening and closing the bleed nozzle 11. As the pulsating current to the coil 18 is increased, the portion of each cycle during which the arm 15 is pulled away from the nozzle 11 is lengthened thus allowing a greater amount of fluid to leak in or out of the conduit 12 per cycle. This is due to the fact that over the major portion of the valve's operating range, the arm 15 does not touch disc 34 as the arm 15 vibrates, so that an increase of current in coil 18 tends to increase the free swing of the arm 15 towards the coil 18 during one half of each cycle, while its swing in the opposite direction, during the other half of the cycle, is limited by abutment with the nozzle 11.

The present vibrating throttling valve 10 may be used to control the flow of a fluid in many types of systems.

Figure 2:
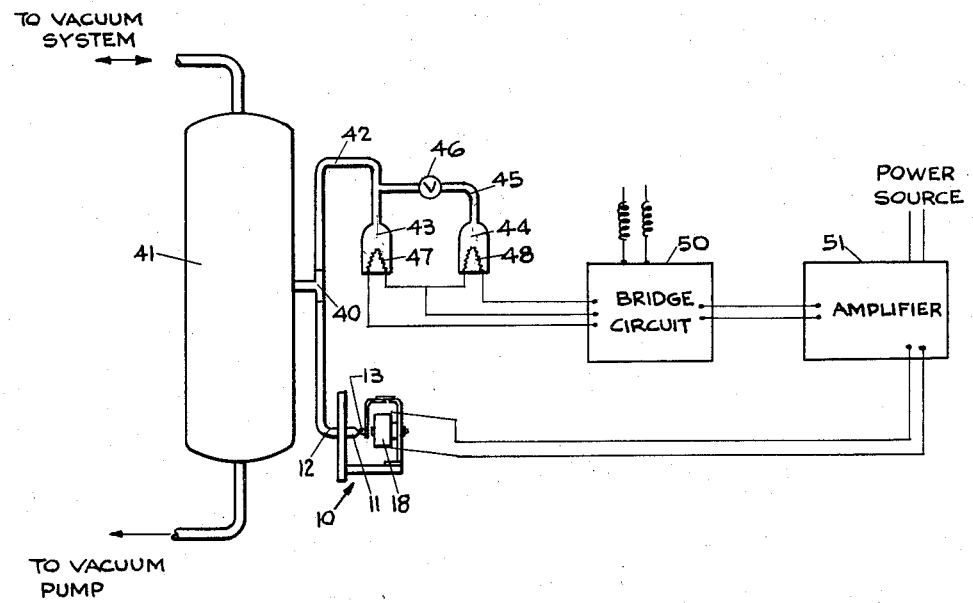
Figure 2 is a diagrammatic sketch illustrating the present valve employed in a vacuum system to maintain a constant pressure in the system.

As shown by way of example in Figure 2, the flow conduit 12 may be coupled to a T 40 on the side of a surge tank 41 in a vacuum system. A second conduit 42 leads from the other arm of the T 40 and communicates with one cell 43 of a Pirani gauge. The other cell 44, which contains gas at a predetermined pressure, is in communication with conduit 42 through a conduit 45 having a normally-closed valve 46 therein. The Pirani gauge is employed as a sensing device for detecting changes in pressure within the surge tank 41 and hence within the vacuum system. In another system, where control of flow is desired, the present valve may be used with a hot-wire flowmeter or any other suitable device as the sensing means.

The resistance wires 47 and 48 of the Pirani cells 43 and 44 form two arms of a bridge circuit 50 whose output signal is fed to an amplifier 51 and hence to the coil 18 of valve 10. As the pressure in tank 41 increases, the pressure in cell 43 also increases, whereupon the bridge 50 becomes unbalanced, sending a greater amount of unbalance voltage to the amplifier 51 and thence to coil 18 of the valve 10. The armature 15 is caused to vibrate at a greater amplitude, thus allowing a greater amount of air to leak into the surge tank 41 through conduit 12. The valve 10 continues to operate in this manner until the pressure of fluid within the surge tank has returned to its predetermined value, i. e., that of the standard cell 44.

Figure 3:
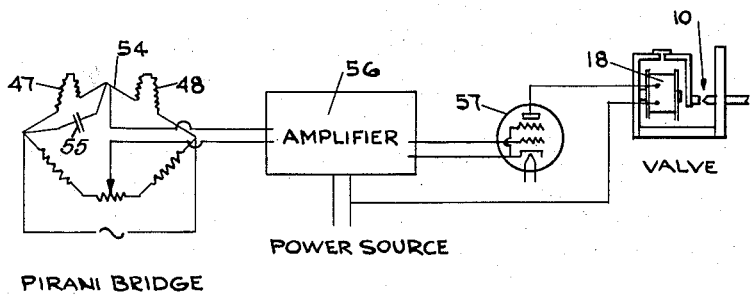
Figures 3 and 4 are diagrammatic sketches illustrating possible electrical circuits which are used with the present valve.

Any suitable electrical circuit may be employed with the present throttling valve 10 which causes the valve to vibrate smoothly at a predetermined rate, say 60 cycles per second, from its open to its closed position with the valve being closed at least one-half of each cycle. As shown in Figure 3, the resistance wires 47 and 48 of the Pirani gauge shown in Figure 2 may form two arms of a bridge 54 which is provided with a capacitor 55. The unbalance signal from the bridge is transmitted to an amplifier 56 which is provided with a thyratron tube 57, shown outside the amplifier for illustration purposes.

Figure 5:
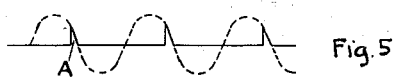
Figures 5, 6 and 7 are diagrams illustrating variations of current passing through the coil of the present valve.

The circuit shown in Figure 3 provides one suitable means of obtaining a thyratron output current which is a smoothly varying function of bridge amplitude unbalance. In this instance, rather than phase control of the thyratron grid, a constant fixed quadrature unbalance is obtained by shunting one bridge element with the capacitor 55. Its value is chosen so that the amplified bridge signal at the thyratron grid lags the thyratron plate voltage by slightly less than 180°. As this signal of fixed phase is varied in amplitude only, the thyratron 57 smoothly changes the point at which it fires during the half cycle its anode is positive. The portion of the half cycle during which it fires depends upon the unbalance of the bridge 54 and hence the demand upon the valve 10. If the thyratron 57 fires late in its firing half cycle, only a small amount of current goes to the coil of the valve 10, which as a result is only opened for a very short interval. As the pulses of current through the coil increase in both time and amplitude, there is a resulting increase in the amplitude of the vibrations of the valve closure member which is graphically illustrated in Figures 5, 6 and 7, where the amount of current supplied to the coil is represented by the area below the lines A, B and C respectively. In Figure 5 only a small amount of current passes through the coil on each cycle thus barely opening the valve. A large amount of coil current shown in Figure 7 results in a substantially wide open valve each half cycle. While the present throttling valve 10 is shown as being opened by its energized coil 18, it is realized that by suitable arrangement of the coil the valve could be in a normally open position with the coil 18 being energized to close the valve.

Figure 4:
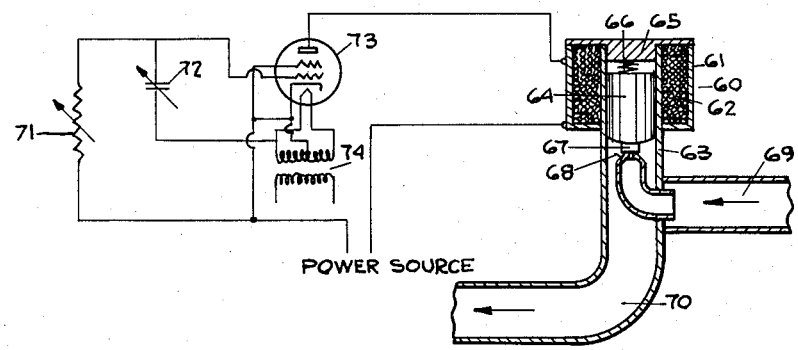

Another application of the present throttling valve applied in this instance to liquid flow, is shown in Figure 4 wherein a vibrating throttling valve 60 is controlled from a remote location. The valve 60 comprises a housing 61 for a coil 62 which surrounds a non-magnetic vertical tubular member 63 in which a weighted cylindrical closure means 64 is slidably mounted. The tubular member 63 is closed at the top by a cover 65 of magnetic material with a spring 66 being mounted between the cover 65 and the slidable closure 64. The closure member 64 is preferably provided with a rubber pad 67 secured to its lower end which rests upon and effectively closes a bleed nozzle 68 which communicates with the upstream conduit 69. Liquid flowing through conduit 69 is discharged through nozzle 68, when the coil 62 is energized, and flows through the discharge conduit 70. The valve 10 of Figure 1 may be also used to control liquid flow if it is encased in a fluidtight housing provided with fluid discharge port means.

Figure 6:
Figure 7:

A suitable circuit for the valve 60 comprises a manually variable resistor 71, a capacitor 72, and a thyratron tube 73 provided with a transformer 74 for supplying the thyratron filament voltage and also providing a voltage out of phase with the anode voltage for control purposes. The combination of capacitor 72 and variable resistor 71 permits selection of grid voltage phase angle so as to smoothly vary the anode current over a major portion of a half cycle as shown in Figures 5, 6 and 7, and resulting in throttle-type valve action as previously described. The setting of the valve is accomplished by varying the value of either the resistor 71 or the condenser 72. By changing the relative magnitude of impedance of the resistor and the impedance of the condenser 72, a phase shift is obtained which causes the valve to open for varying lengths of time.

I claim as my invention:

A fluid pressure system including a flow control valve associated with the system vibrating between open and closed positions to maintain the pressure within said system at substantially a predetermined value, means for effecting such vibration of the valve when the pressure in the system varies from said predetermined value comprising a bridge the electrical balance of which is determined by the pressure condition in said system on the one hand and a fixed adjustment on the other determined by said predetermined pressure, said bridge being in balance when the system pressure is at its predetermined value, a power circuit coupled to said bridge and controlled by a signal therefrom to produce continuously a fixed phase pulsed current having pulses of an amplitude and duration proportional to said signal, said flow control valve having a flow nozzle, a closure member for the nozzle, magnetic core means supported by said closure member, and a coil disposed around said core means, said coil being connected to and energized by said power circuit, the flow through the control valve being proportional to the signal from said pressure-sensing means to maintain the pressure difference.

References Cited in the file of this patent

UNITED STATES PATENTS

| Number | Name | Date |
| --- | --- | --- |
| 928,043 | Golden | July 13, 1909 |
| 2,207,921 | Huxford | July 16, 1940 |
| 2,405,761 | Simmie | Aug. 13, 1946 |
| 2,428,269 | Eaves | Sept. 30, 1947 |
| 2,433,205 | Decker | Dec. 23, 1947 |
| 2,501,583 | Schafer | Mar. 21, 1950 |
| 2,527,136 | Kagi | Oct. 24, 1950 |
| 2,609,965 | Kast | Sept. 9, 1952 |
| 2,610,300 | Walton | Sept. 9, 1952 |
| 2,635,138 | Reisner | Apr. 14, 1953 |